(12) United States Patent
Costello et al.

(10) Patent No.: US 10,670,473 B2
(45) Date of Patent: Jun. 2, 2020

(54) SENSOR WITH INTEGRAL VORTEX TUBE FOR WARMING

(71) Applicants: Rolls-Royce Corporation, Indianapolis, IN (US); Rolls-Royce North American Technologies Inc., Indianapolis, IN (US)

(72) Inventors: John Joseph Costello, Indianapolis, IN (US); Roy F. Mills, Indianapolis, IN (US); Geoffrey L. Gatton, Brownsburg, IN (US); Dawn Kay Andrus, Avon, IN (US)

(73) Assignees: ROLLS-ROYCE NORTH AMERICAN TECHNOLOGIES, INC., Indianapolis, IN (US); ROLLS-ROYCE CORPORATION, Indianapolis, IN (US)

( * ) Notice: Subject to any disclaimer, the term of this patent is extended or adjusted under 35 U.S.C. 154(b) by 97 days.

(21) Appl. No.: 15/658,627

(22) Filed: Jul. 25, 2017

(65) Prior Publication Data

US 2019/0033141 A1 Jan. 31, 2019

(51) Int. Cl.
| | |
|---|---|
| *F25B 9/02* | (2006.01) |
| *F25B 9/04* | (2006.01) |
| *G01K 1/20* | (2006.01) |
| *F02C 7/04* | (2006.01) |
| *F01D 15/12* | (2006.01) |
| *G01K 13/02* | (2006.01) |
| *F01D 25/12* | (2006.01) |
| *G01L 1/00* | (2006.01) |

(Continued)

(52) U.S. Cl.
CPC .............. *G01K 1/20* (2013.01); *B64D 15/04* (2013.01); *F01D 17/02* (2013.01); *F01D 25/12* (2013.01); *F02C 7/047* (2013.01); *F25B 9/04* (2013.01); *G01K 13/028* (2013.01); *G01L 1/00* (2013.01); *F05D 2220/323* (2013.01); *F05D 2260/209* (2013.01); *G01K 2205/02* (2013.01)

(58) Field of Classification Search
CPC .... F25B 9/02; F25B 9/04; G01K 1/20; G01K 13/02; G01K 13/028; G01K 2205/02; F02C 7/047; F05D 2220/323; F05D 2260/209; F01D 15/12
USPC ...................................... 73/170.02
See application file for complete search history.

(56) References Cited

U.S. PATENT DOCUMENTS 2,826,070 A 3/1958 Box et al.
2,858,698 A * 11/1958 Hickey ................. B64D 15/12
244/134 R (Continued)

OTHER PUBLICATIONS

Anonymous, "Vortex tube," dated Jun. 4, 2017, pp. 1-6, Retrieved from the Internet at URL: https://en.wikipedia.org/w/index.php?title=Vortex_tube&oldid=783717727.

(Continued)

*Primary Examiner* — Frantz F Jules
*Assistant Examiner* — Erik Mendoza-Wilkenfel
(74) *Attorney, Agent, or Firm* — Brinks Gilson & Lione

(57) ABSTRACT

Sensor assemblies and methods of de-icing or preventing ice formation are provided. Compressed air may be supplied to a vortex tube. The vortex tube may separate the compressed air into a first stream and a second stream, the first stream hotter than the second stream. A sensor body may be warmed by the first stream, and the second stream may be directed away from the sensor body.

16 Claims, 9 Drawing Sheets

(51) Int. Cl.
    *F01D 17/02*     (2006.01)
    *B64D 15/04*     (2006.01)
    *F02C 7/047*     (2006.01)

(56) References Cited

U.S. PATENT DOCUMENTS

| | | | | |
|---|---|---|---|---|
| 2,942,472 | A | 6/1960 | Harney | |
| 3,139,751 | A | 7/1964 | Rosenthal et al. | |
| 3,259,145 | A * | 7/1966 | Engle | F15C 1/16 |
| | | | | 137/884 |
| 3,512,414 | A * | 5/1970 | Rees | G01K 13/02 |
| | | | | 244/134 R |
| 3,973,396 | A * | 8/1976 | Kronogard | F02C 7/18 |
| | | | | 60/806 |
| 4,710,095 | A | 12/1987 | Freberg et al. | |
| 4,818,178 | A * | 4/1989 | Sibbertsen | F01D 5/187 |
| | | | | 415/115 |
| 5,406,839 | A * | 4/1995 | Leblond | G01P 13/025 |
| | | | | 73/170.02 |
| 6,698,281 | B1 * | 3/2004 | Choisnet | G01P 5/165 |
| | | | | 73/170.01 |
| 8,517,604 | B2 | 8/2013 | Parsons | |
| 2004/0177683 | A1 * | 9/2004 | Ice | G01K 13/02 |
| | | | | 73/170.02 |
| 2014/0345579 | A1 * | 11/2014 | Keppy | F02M 26/30 |
| | | | | 123/568.12 |

OTHER PUBLICATIONS

European Search Report, issued in EP Application No. 18 18 0130, dated Dec. 12, 2018, pp. 1-8, European Patent Office, Munich, Germany.

\* cited by examiner

SENSOR WITH INTEGRAL VORTEX TUBE FOR WARMING

TECHNICAL FIELD

This disclosure relates to sensor assemblies and, in particular, to any sensors assembly that includes a sensor body.

BACKGROUND

Sensors are often installed on aircraft, in jet engines, or in any location where ice may form on the sensors. A sensor may give improper readings if ice is on the sensor. For example, an ambient air temperature sensor may not detect the proper temperature of the ambient air if the sensor is at least partially covered by ice.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Sensor assemblies and methods for de-icing and/or preventing ice formation are provided. In one such example, a sensor assembly for de-icing and/or preventing ice formation comprises a sensor body, a sensor coupled to the sensor body, and a vortex tube enclosed at least in partly within the sensor body. The vortex tube may be a Ranque-Hilsch vortex tube, which is a device that separates compressed air into a first stream that exits a first outlet and a second stream that exits a second outlet, where the first stream is hotter than the second stream. The hotter first stream may be directed to the sensor body for warming the sensor body. The sensor body may include, for example, an air inlet structure that is configured to receive air directed at the sensor body and channel the received air so as to form the compressed air.

One interesting feature of the systems and methods described below may be that the hotter stream exiting the vortex tube may warm a targeted, localized area of the sensor assembly, which helps avoid inadvertently heating the sensor when warming the sensor assembly. Inadvertently heating the sensor may introduce errors in sensor readings. Alternatively, or in addition, an interesting feature of the systems and methods described below may be that including an electrical heating element in the sensor assembly may become unnecessary or optional.

Figure 1:
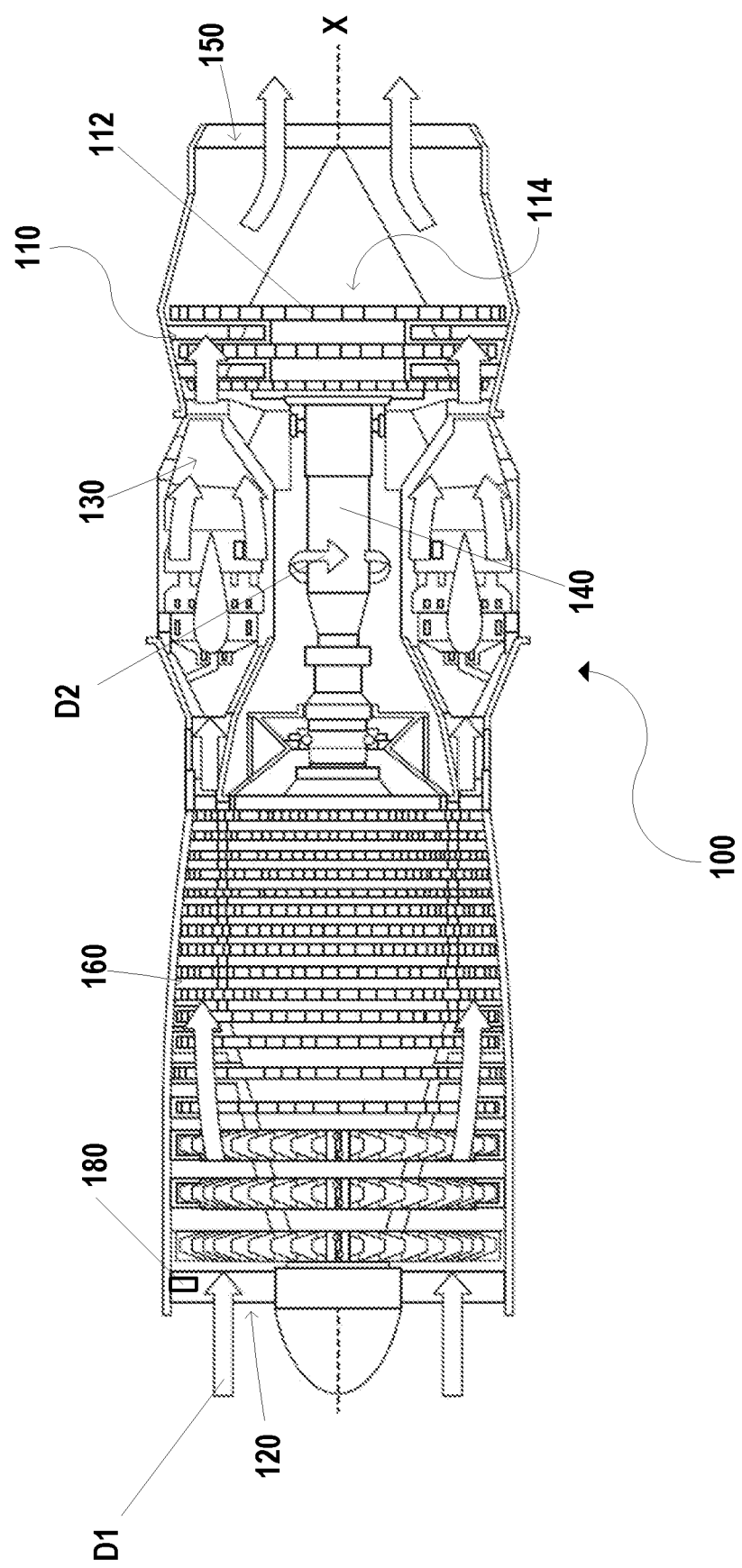
FIG. 1 is a cross-sectional view of a gas turbine engine.

FIG. 1 is a cross-sectional view of a gas turbine engine 100 for propulsion of, for example, an aircraft. Alternatively or in addition, the gas turbine engine 100 may be used to drive a propeller in aquatic applications, or to drive a generator in energy applications. The gas turbine engine 100 may include an intake section 120, a compressor section 160, a combustion section 130, a turbine section 110, and an exhaust section 150. During operation of the gas turbine engine 100, fluid received from the intake section 120, such as air, travels along the direction D1 and may be compressed within the compressor section 160. The compressed fluid may then be mixed with fuel and the mixture may be burned in the combustion section 130. The combustion section 130 may include any suitable fuel injection and combustion mechanisms. The hot, high pressure fluid may then pass through the turbine section 110 to extract energy from the fluid and cause a turbine shaft of a turbine 114 in the turbine section 110 to rotate, which in turn drives the compressor section 160. Discharge fluid may exit the exhaust section 150.

As noted above, the hot, high pressure fluid passes through the turbine section 110 during operation of the gas turbine engine 100. As the fluid flows through the turbine section 110, the fluid passes between adjacent blades 112 of the turbine 114 causing the turbine 114 to rotate. The rotating turbine 114 may turn a shaft 140 in a rotational direction D2, for example. The blades 112 may rotate around an axis of rotation, which may correspond to a centerline X of the turbine 114 in some examples.

A sensor assembly 180 may be positioned at the intake section 120. The sensor assembly 180 may be, for example, a sensor probe that measures total air temperature. The sensor assembly 180 positioned at the intake section 120 may be at a location known as T2 under international standard SAE® AS755 issued by SAE International (SAE is a registered trademark of SAE International Corporation of Pennsylvania). Alternatively, the sensor probe may be located at any other location at the intake section 120 of the gas turbine engine 100 or at any other location on the gas turbine engine 100 that is suitable to measure the total air temperature.

Figure 2:
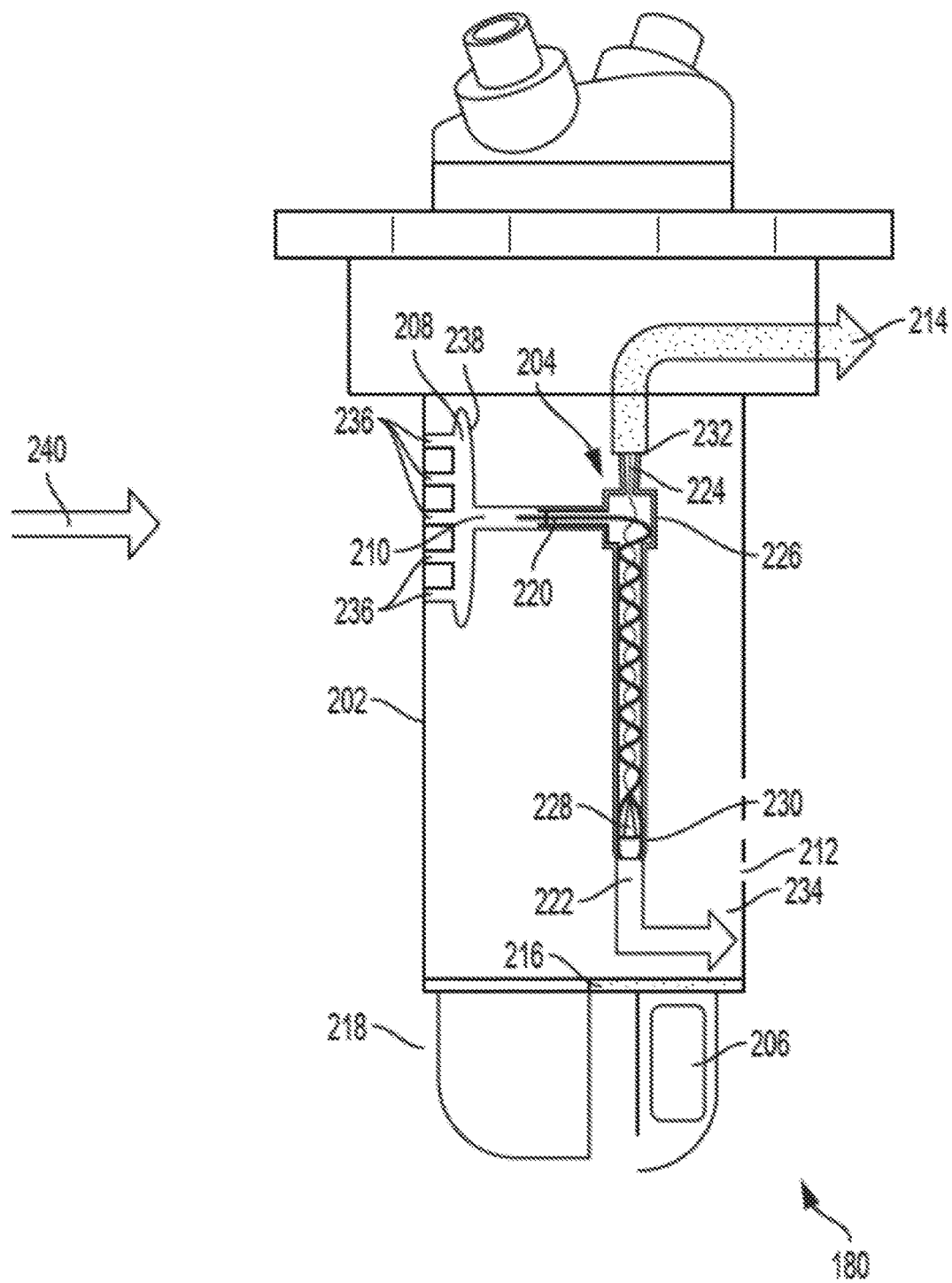
FIG. 2 is a side cross-sectional view of an example of a sensor assembly.

FIG. 2 is a side cross-sectional view of an example of the sensor assembly 180. The sensor assembly 180 illustrated in FIG. 2 includes a sensor body 202, a vortex tube 204, and a sensor 206. The sensor body 202 in the illustrated example also includes an air collection manifold 208, an air inlet nozzle 210, one or more warm air exhaust holes 212, a cold air exhaust line 214, a thermal shield 216, and a lower portion 218 of the sensor body that houses the sensor 206.

The vortex tube 204 may be a device sometimes referred to as a Ranque-Hilsch vortex tube. The vortex tube 204 is a mechanical device that separates compressed air 220 entering the vortex tube 204 into a hot stream 222 and a cold stream 224. The temperature difference between the gas in the hot stream 222 and the gas the cold stream 224 may be significant. For example, the gas in the hot stream 222 may be 200 degrees Celsius (392 degrees Fahrenheit), while the gas in the cold stream 224 may be −50 degrees Celsius (−58 degrees Fahrenheit). In other examples, depending on the design of the vortex tube 204 and other factors, the temperature difference between the gas in the hot stream 222 and the gas the cold stream 224 may vary. Similarly, the temperatures of the gases in the hot stream 222 and the cold stream 224 may depend on the design of the vortex tube 204 and other factors. In some examples, the temperature of the hot stream 222 may be in a range of 80 to 100 degrees centigrade above ambient temperature. In other examples, depending on the design of the vortex tube 204 and other factors, such as pressure, humidity, and density of the compressed air 220, the temperature of the hot stream 222 may be outside of the range of 80 to 100 degrees centigrade above ambient temperature. The terms "hot" and "cold" in "hot stream" and the "cold stream", respectively, merely indicate that the hot stream 222 is hotter than the cold stream 224, and the cold stream 224 is colder than the hot stream 222, and are not meant to indicate any particular temperature.

The vortex tube 204 may operate without moving parts. For example, the vortex tube 204 may be configured to inject the compressed air 220 tangentially into a swirl chamber 226 where the compressed air 220 accelerates and rotates in the swirl chamber 226. A conical nozzle 228 located at a first end of the vortex tube 204 permits only an outer vortex of the gas to exit the vortex tube 204 through a first outlet 230 as the hot stream 222. The first outlet 230 may be referred to as the hot stream outlet. The remainder of the gas is forced to return in an inner vortex that has a smaller diameter than the outer vortex. The inner vortex may exit the vortex tube 204 as the cold stream 224 at a second end of vortex tube 204 that is opposite of the first end. The cold stream 224 may exit the vortex tube 204 through a second outlet 232. The second outlet 232 may be referred to as the cold stream outlet.

The vortex tube 204 may be enclosed at least partially within the sensor body 202. In the example illustrated in FIG. 2, the vortex tube 204 is completely enclosed by the sensor body 202.

The hot stream 222 from the vortex tube 204 is directed to the sensor body 202 in order to add heat to the sensor body 202. For example, the hot stream 222 may flow into a chamber 234 defined by the sensor body 202. Alternatively or in addition, one or more channels (not shown) may guide the hot stream 222, or a portion thereof, to the sensor body 202. In some examples, the hot stream 222 may flow along an inner portion of the sensor body 202. Alternatively or in addition, the hot stream 222 may exit warm air exhaust holes 212 located on one or more sides (not shown) of the sensor body 202 and flow along an outside portion of the sensor body 202.

Figure 3:
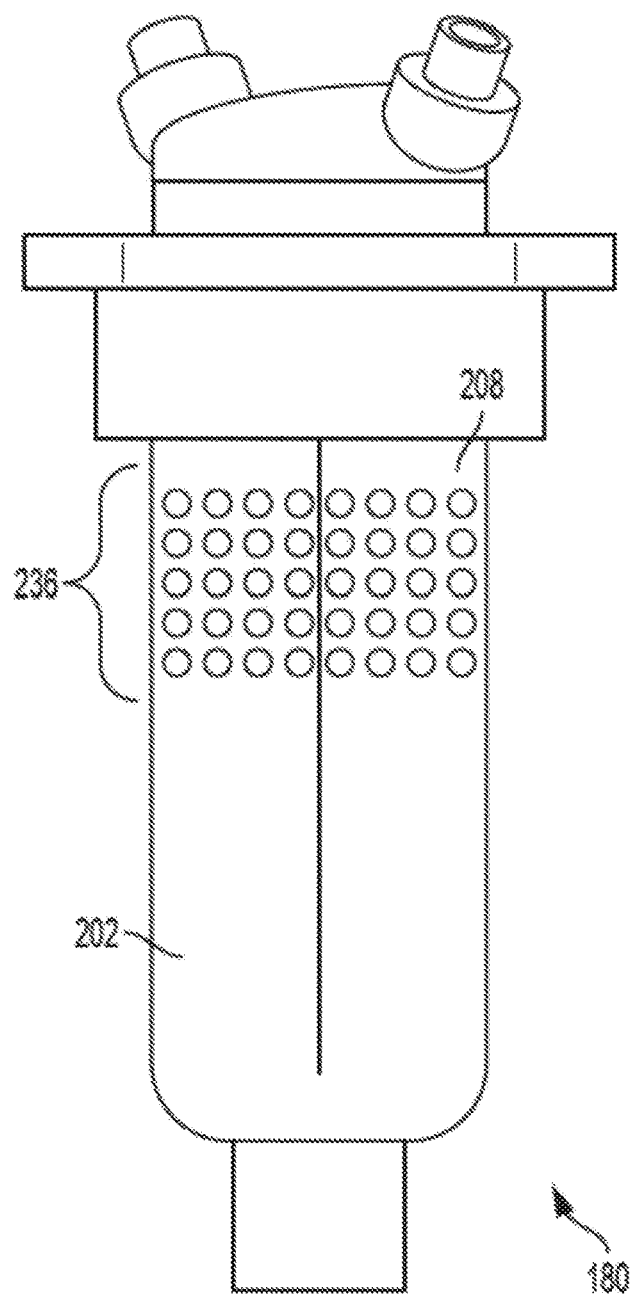
FIG. 3 illustrates a front view of an example of a sensor assembly.

The air collection manifold 208 may be any structure comprising multiple openings 236 that is configured to receive air through the openings 236 and direct the collected air to the air inlet nozzle 210. The air collection manifold 208 in the example illustrated in FIG. 2 is located on an upstream side (front) of the sensor body 202. FIG. 3 illustrates a front view of an example of the sensor assembly 180 in which the openings 236 of the air collection manifold 208 are arranged in a substantially rectangular pattern as viewed from the front of the sensor body 202. The air collection manifold 208 may include, for example, 25 to 50 of the openings 236 that have a width in a range of, for example, 0.020 inches to 0.040 inches. Referring back to FIG. 2, the air collection manifold 208 may include a collection channel 238 that is structured to collect air received through the openings 236 and direct the collected air to the air inlet nozzle 210.

The openings 236 of the air collection manifold 208 may be arranged in any pattern. For example, the openings 236 may be arranged in a circular pattern, a square pattern, a star pattern, or any other regular or irregular pattern. The collection channel 238 may be in any shape suitable to direct the collected air to the air inlet nozzle 210. For example, the collection channel 238 may be cone-shaped, dish-shaped, or any other suitable regular or irregular shape. In some examples, the collection channel 238 may include a network of passages.

In FIG. 2, the thermal shield 216 is located between the sensor 206 and the chamber 234 into which the hot stream 222 flows. The thermal shield 216 may limit any heat transfer from the hot stream 222 to the sensor 206. In other examples, the sensor body 202 and the sensor assembly 180 may not include a thermal shield.

During operation of the sensor assembly 180, air 240 may flow toward and around the sensor assembly 180. A portion of the air 240 may enter the air collection manifold 208. The air collection manifold 208 and/or the air inlet nozzle 210, due to the velocity of the air 240 relative to the sensor assembly 180 and the respective shape of the air collection manifold 208 and/or the air inlet nozzle 210, compress the air that enters the air collection manifold 208. The resulting compressed air 220 enters the vortex tube 204.

The vortex tube 204 generates the hot stream 222 and the cold stream 224. The hot stream 222 may enter the chamber 234 defined by the sensor body 202. Heat from the hot stream 222 may transfer to the sensor body 202. The heat transferred to the sensor body 202 may prevent ice from forming on the sensor body 202. Alternatively or in addition, the heat transferred to the sensor body 202 may melt ice formed on or otherwise in contact with the sensor body 202.

The hot stream 222 may exit through the one or more warm air exhaust holes 212. In some examples, the hot stream 222, after exiting the one or more warm air exhaust holes 212, may prevent ice from forming on the sensor body 202 and/or melt ice formed on or otherwise in contact with the sensor body 202.

The cold stream 224 may flow through the cold air exhaust line 214 and be routed elsewhere. In some examples, the exhaust line 214 may exhaust the cold stream 224 adjacent to where the sensor assembly 180 attaches to a surface, such as at the top of sensor assembly 180 as shown in FIG. 2. The cold stream 224, after leaving the exhaust line 214, may flow into the intake section 120 of the gas turbine engine 100. In another example, the cold stream 224 may be routed to and introduced into the compressor section 160 of the gas turbine engine 100. Alternatively or in addition, the cold stream 224 may be used for cooling a component of the gas turbine engine 100. Alternatively or in addition, the cold stream 224 may be used for any other cooling purpose, such as cooling an internal combustion engine.

Figure 4:
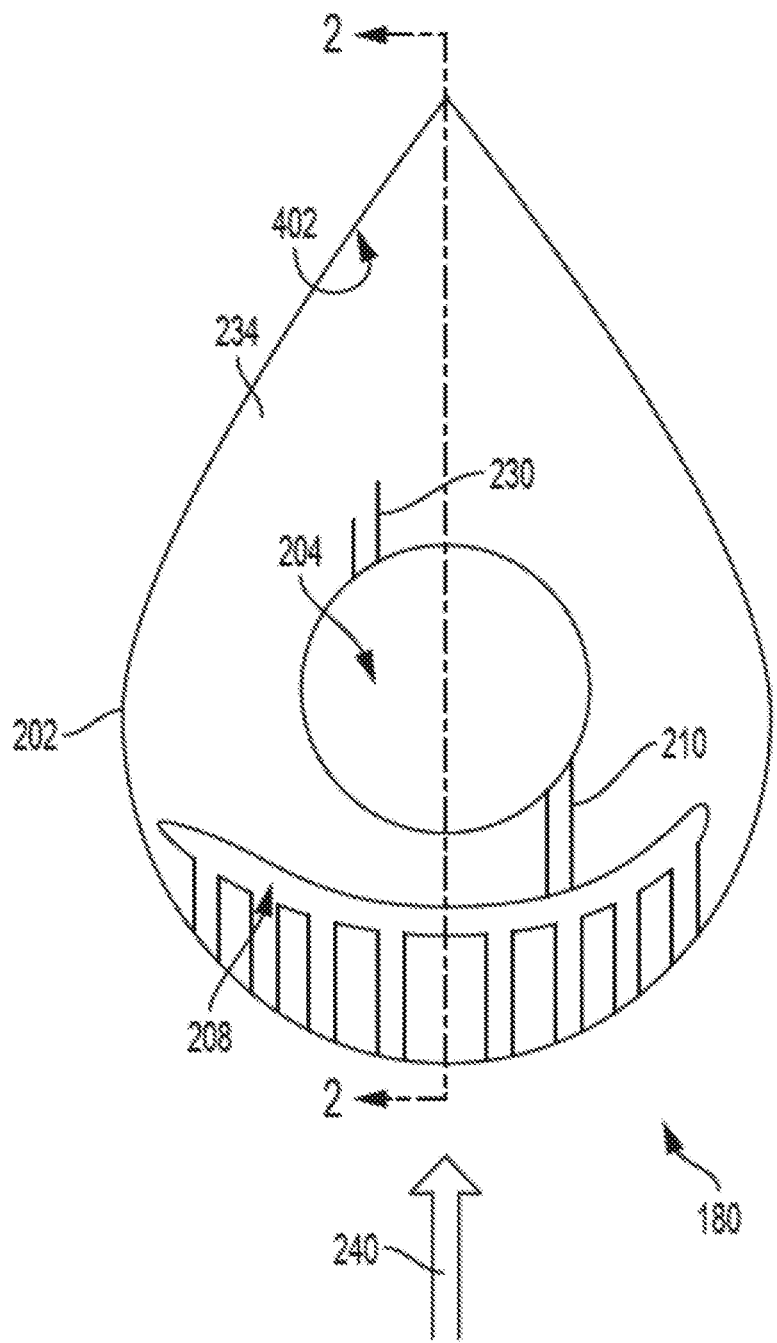
FIG. 4 is a cross-sectional view of an example of a sensor assembly.

FIG. 4 is a cross-sectional view of the sensor assembly 180 as viewed from the top of the sensor assembly 180. The sensor body 202 is in the shape of an airfoil at the cross-section shown in FIG. 4. Specifically, the sensor body 202 has a rounded leading edge facing the flow of the air 240, a sharp trailing edge opposite of the leading edge, and curved side surfaces between the leading and trailing edges that are symmetric about a centerline of the sensor assembly 180 that runs from the leading edge to the trailing edge. FIG. 4 illustrates an example of the hot stream outlet 230 extending into the chamber 234 and toward the back (downstream end) of the sensor body 202. By extending toward the back of the sensor body 202, the hot stream outlet 230 depicted in FIG. 4 directs the hot stream 222 toward an inner surface 402 of the sensor body 202 toward the back of the sensor body 202. In other examples, the hot stream outlet 230 and/or other ducts or channels may guide the host stream outlet 230 to any area of the sensor assembly 180 targeted for warming.

Figure 5:
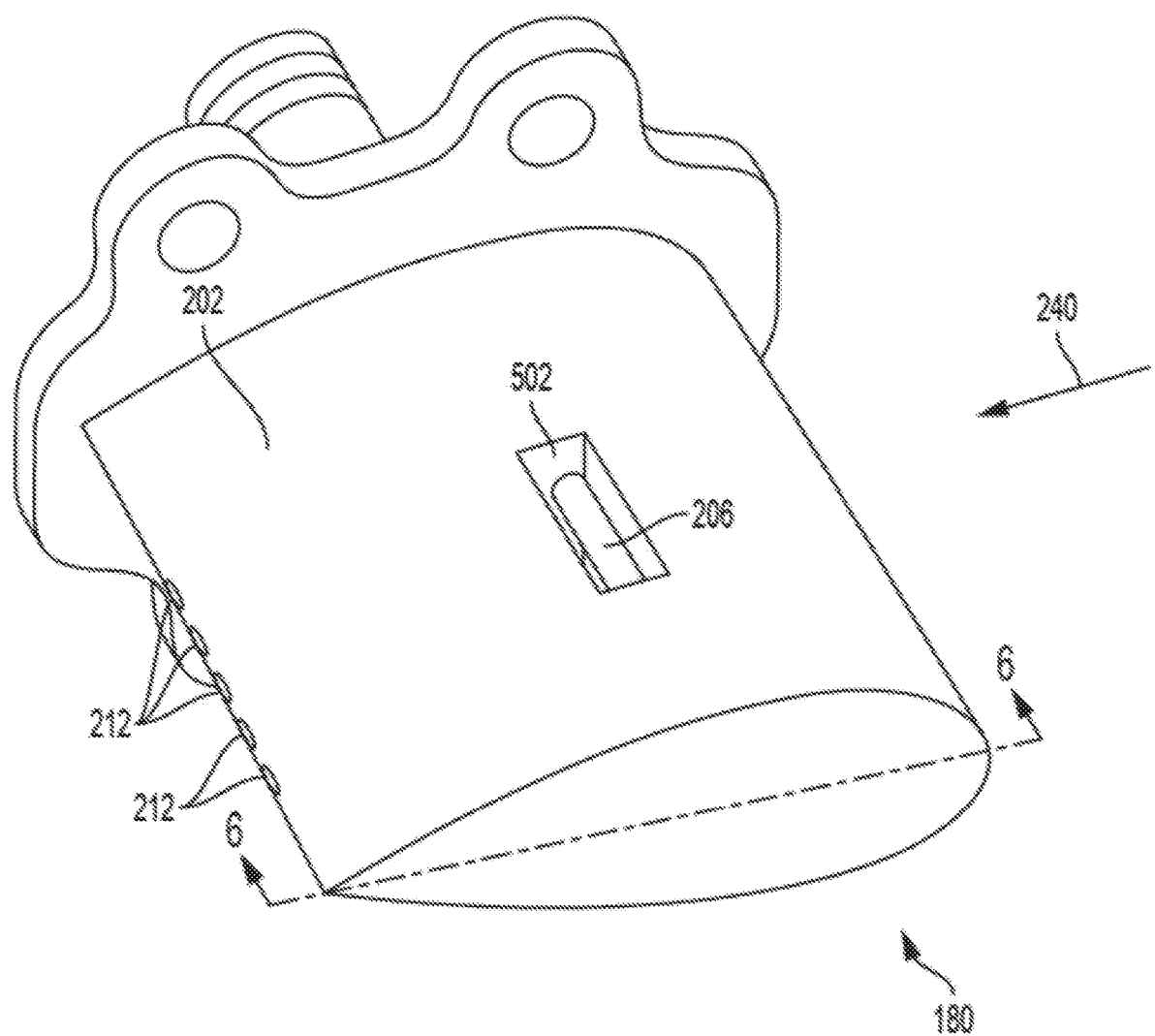
FIG. 5 is a perspective view of an example of a sensor assembly in which a sensor is located in an exposed opening of a sensor body.

FIG. 5 is a perspective view of an example of the sensor assembly 180 in which the sensor 206 is located in an exposed opening 502 of the sensor body 202. In the example illustrated in FIG. 5, the sensor body 202 does not include the air collection manifold 208. The compressed air 220 for the vortex tube 204 is supplied from a source external to the sensor assembly 180. For example, the compressed air 220 may be compressor bleed air, which is pressurized air "bled" or extracted from the compressor section 160 of the gas turbine engine 100.

Figure 6:
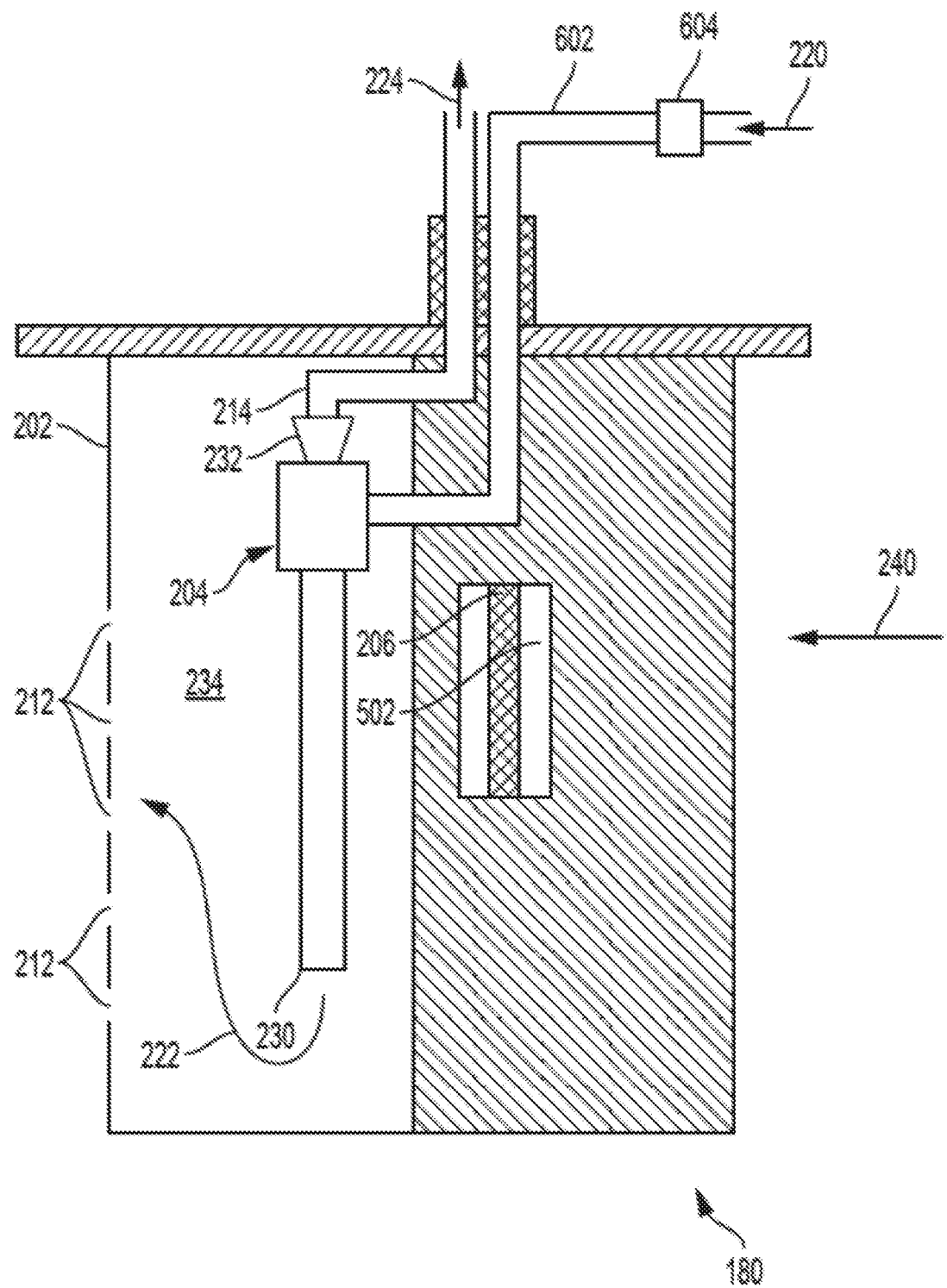
FIG. 6 is a cross-sectional view of the sensor assembly that is shown in FIG. 5.

FIG. 6 is a cross-sectional view of the example of the sensor assembly 180 that is shown in FIG. 5. The compressed air 220 is received by the sensor assembly 180 through a supply line 602 from a source (not shown) that is external to the sensor assembly 180. In some examples, a valve 602 on the supply line 602 is adjustable to control the amount of the compressed air 220 that passes through the supply line 602.

During operation of the sensor assembly 180, a processor (not shown), such as a microcontroller, a central processing unit, or any other type of programmable controller, may adjust the amount of compressed air 220 that flows to the vortex tube 204 by controlling the value 602. For example, the processor may be programmed to adjust the flow of the compressed air 220 as a function of an ambient temperature and/or any other detected physical characteristic(s). In one such example, if the processor determines that heat should be added to the sensor body 202 in order to prevent ice build-up and/or to melt ice formed on the sensor assembly 180, the processor may open the valve 604. The compressed air 220 may enter the vortex tube 204. As a result, the hot stream 222 may exit the hot stream outlet 230 into the chamber 234 of the sensor body 202. Heat from the hot stream 222 may transfer to the sensor body 202. The air from the hot stream 222 may exit the sensor body 202 through the one or more warm air exhaust holes 212. In the manner described above, the valve 604 may adjust the air flow into the vortex tube 204 in order to adjust warming capacity of the hot stream 222.

The sensor assembly 180 may be implemented in many different ways. For example, the sensor 206 may include a temperature sensor, such as a resistive temperature detector, a platinum resistance thermometer, a thermistor, a thermocouple, an electro-mechanical temperature sensor, and/or any other type of device that detects temperature or changes in temperature. Alternatively or in addition, the sensor 206 may include a pressure sensor, such as an absolute pressure sensor, a gauge pressure sensor, a differential pressure sensor, a sealed pressure sensor, a piezoresistive strain gauge, a capacitive pressure sensor, an electromagnetic pressure sensor, a piezoelectric sensor, a piezoelectric pressure sensor, an optical pressure sensor, a potentiometric pressure sensor, a resonant pressure sensor, a thermal pressure sensor, an ionization pressure sensor, or any other device that detects pressure or changes in pressure. Alternatively or in addition, the sensor 206 may include an altimeter. Alternatively or in addition, the sensor 206 may include any other type of sensor.

The sensor body 202 may have any shape. In some examples, the sensor body 202 or a portion of the sensor body 202 may be shaped as an airfoil.

The sensor body 202 may be constructed of any material. Examples of the material may include metal, metal alloy, ceramic, and/or ceramic matrix composite. The lower portion 218 of the sensor body 202 that houses the sensor 206 in the example shown in FIG. 2 may be constructed from a material that is different from the rest of the sensor body 202.

For example, the material used for the lower portion 218 of the sensor body 202 that houses the sensor 206 may have a lower thermal conductivity than the rest of the sensor body 202. In some examples, the sensor body 202 may be constructed from only one type of material.

The sensor body 202 may be constructed using additive manufacturing, which may sometimes be referred to three-dimensional printing. Additive manufacturing refers to a process by which digital design data is used by a machine to build up a component in layers by depositing material. Alternatively or in addition, the sensor body 202 may be machined.

The vortex tube 204 may be integral to the sensor body 202. For example, when constructing the sensor body 202 using additive manufacturing, the vortex tube 204 may be constructed together with the sensor body 202 using additive manufacturing. Alternatively, the vortex tube 204 may be a discrete component that is coupled to the sensor body 202. For example, the vortex tube 204 may be coupled to an interior portion of the sensor body 202.

The vortex tube 204 may be aligned vertically with the sensor body 202 as shown in FIGS. 2 and 6. In other words, the vortex tube 204 may be positioned perpendicular to the flow of the air 240 outside of the sensor body 202. In other examples, the vortex tube 204 may be positioned at any other angle with respect to the sensor body 202 and/or the flow of the air 240 outside of the sensor body 202.

The sensor 206 may be coupled directly or indirectly to the sensor body 202. For example, the sensor 206 may be held in place by static friction between the sensor 206 and one or more walls of the sensor body 202. Alternatively or in addition, the sensor 206 may be attached to one or more portions of the sensor body 202. For example, two ends of the sensor 206 are attached to the sensor body 202 in the example shown in FIGS. 5 and 6. The sensor 206 is positioned within the sensor body 202 in the examples shown in FIGS. 1 and 5.

The warm air exhaust holes 212 may be of any size or shape. In some examples, the warm air exhaust holes 212 may have a width in a range from 0.020 inches to 0.040 inches.

In FIG. 1, the sensor assembly 180 is located at the intake section 120 of the gas turbine engine 100. However, more generally, the sensor assembly 180 may be located anywhere on the gas turbine engine 100 or anywhere on an aircraft. The aircraft on which the sensor assembly 180 is located may not include a gas turbine engine in some examples. The sensor assembly 180 may be located anywhere that is suitable for sensing a physical characteristic, for example, temperature or pressure, that the sensor assembly 180 is configured to sensor. In some examples, the sensor assembly 180 may not be located on an engine or even on an aircraft. Instead, the sensor assembly 180 may be located in an environment exposed to the flow of air 240 or any other fluid.

The sensor assembly 180 may be implemented with additional, different, or fewer components. For example, the sensor assembly 180 may only include the assembly body 202, the vortex tube 204, and the sensor 206. In another example, the sensor assembly 180 includes a processor (not shown) that controls the valve 604, which in turn controls the flow of the compressed air 220 to the vortex tube 204. In some examples, the valve 604 is located between the air collection manifold 208—or other air inlet structure—and the vortex tube 202. In such a location, the valve 604 may adjust the amount of the compressed air 220 that flows into the vortex tube 204, thereby adjusting the warming capacity of the hot stream 222.

Figure 7:
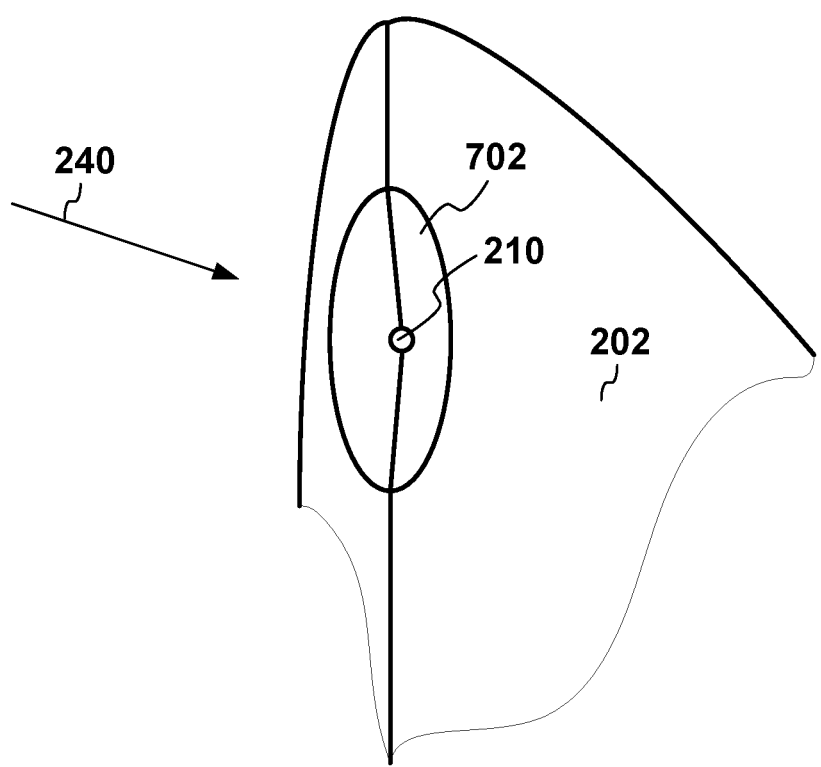
FIG. 7 is a perspective view of a front portion of a sensor body that includes a cone funnel instead of an air collection manifold.

Each component may include additional, different, or fewer components. For example, FIG. 7 is a perspective view of a front portion of the sensor body 202 that includes an air intake structure other than the air collection manifold 208. In particular, the sensor body 202 includes a cone funnel 702 that focuses and directs the flow of air 240 to the air inlet nozzle 210 thereby creating the compressed air 220 for the vortex tube 204.

Figure 8:
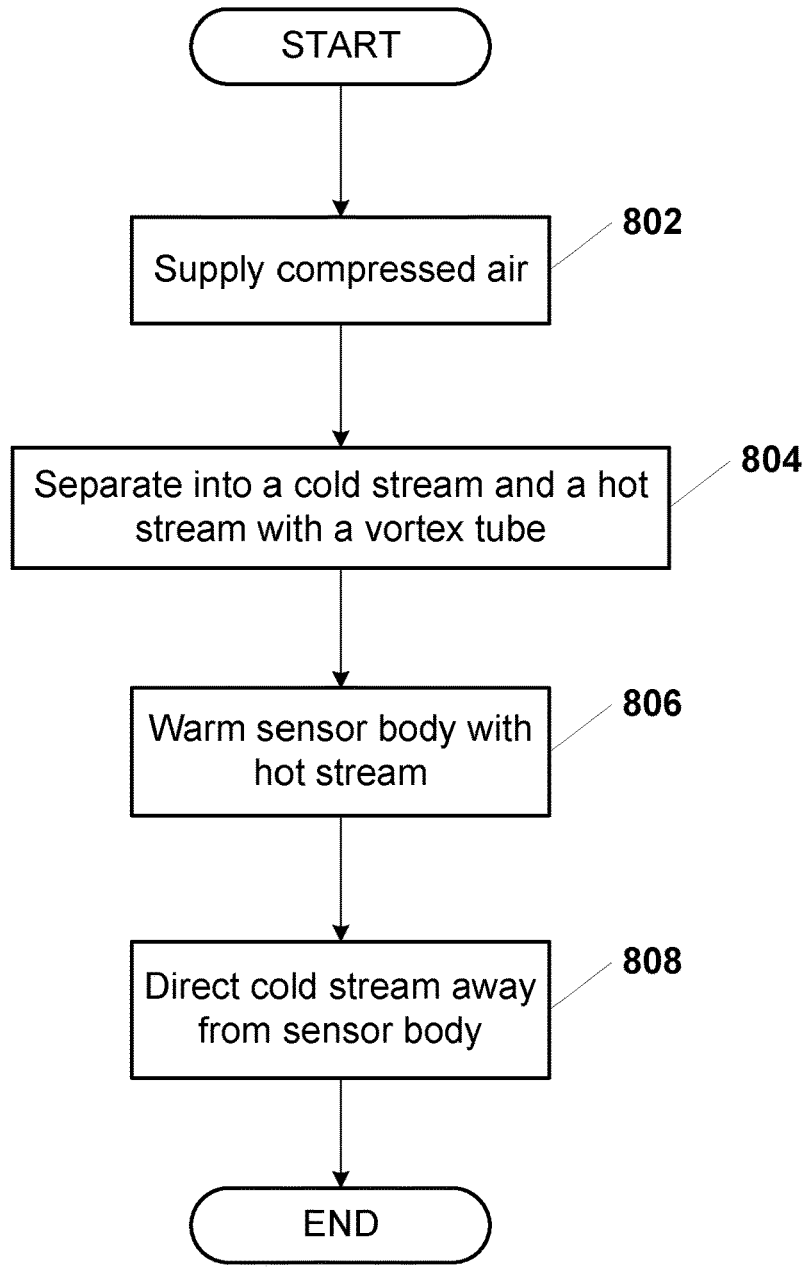
FIG. 8 illustrates a flow diagram of an example of a process of de-icing and/or preventing ice formation on a sensor assembly.

FIG. 8 illustrates a flow diagram of an example of a process of de-icing and/or preventing ice formation on the sensor assembly 180. The operations may be executed in a different order than illustrated in FIG. 8.

Operations may begin by supplying (802) compressed air to the vortex tube 204. The compressed air may be separated (804) by the vortex tube 204 into the hot stream 222 and the cold stream 224.

Next, the sensor body 202 may be warmed (806) by the hot stream 222.

The cold stream 224 may be directed (808) away from the sensor body 202.

The process may include additional, different, or fewer operations than illustrated in FIG. 8. For example, the process may not include directing (808) the cold stream 224 away from the sensor body 202.

Figure 9:
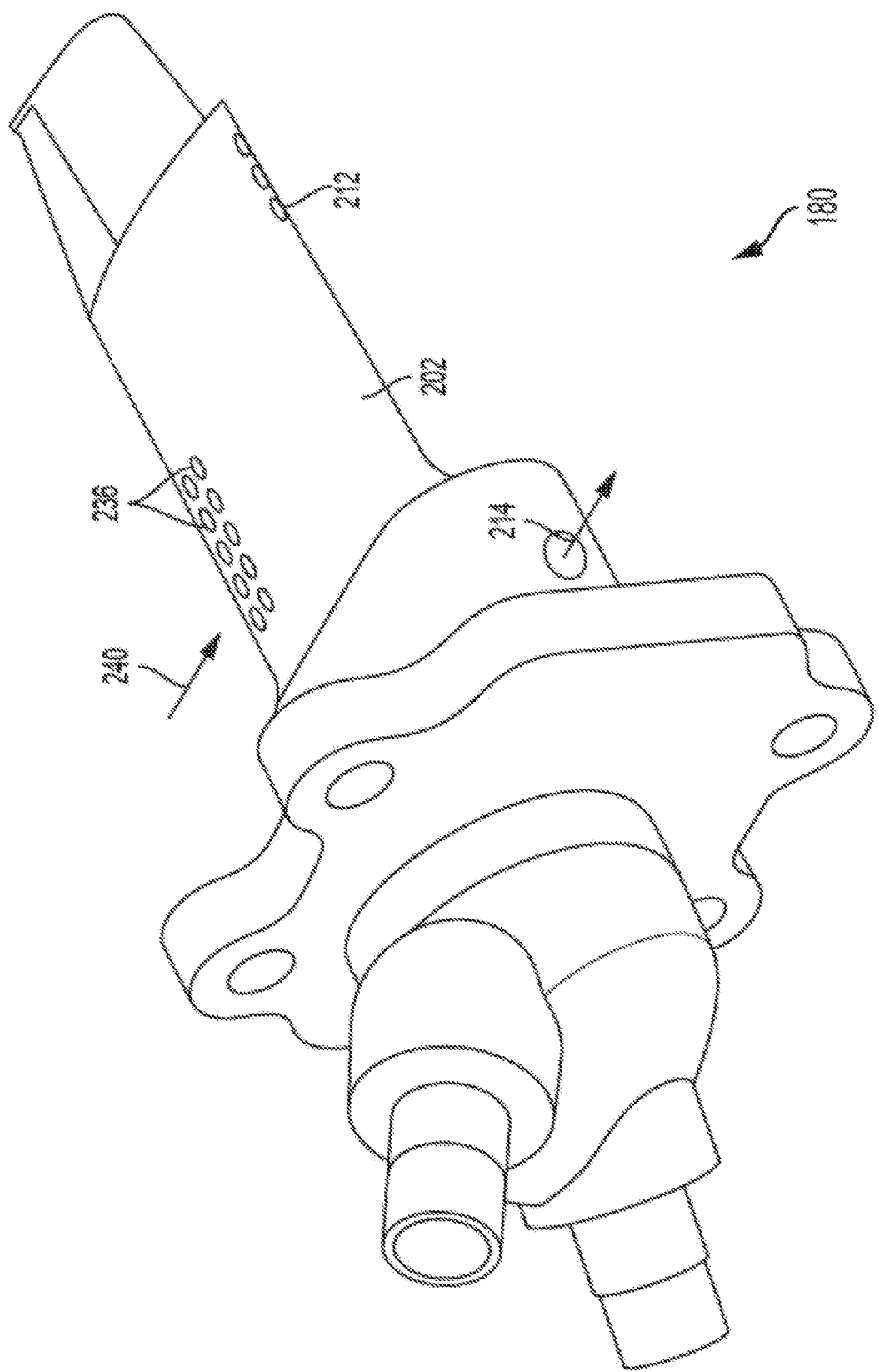
FIG. 9 is a perspective view of the sensor assembly that is shown in FIGS. 2-4.

FIG. 9 is a perspective view of the sensor assembly 180 that is shown in FIGS. 2-4.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A sensor assembly comprising:
   a sensor body;
   a sensor coupled to the sensor body; and
   a vortex tube enclosed at least in partly within the sensor body, the vortex tube including a first outlet and a second outlet, the vortex tube configured to separate compressed air into a first stream that exits the first outlet and a second stream that exits the second outlet, the first stream hotter than the second stream, the first stream directed to the sensor body for warming the sensor body.
2. The sensor assembly of aspect 1, wherein the vortex tube is integral to the sensor body.
3. The sensor assembly of any of aspects 1 to 2, wherein the sensor body comprises an air collection manifold configured to generate the compressed air from an airflow directed at the sensor body.
4. The sensor assembly of aspect 3, wherein a plurality of holes in the air collection manifold are configured to receive air from the airflow.
5. The sensor assembly of any of aspects 1 to 4, wherein the first outlet is positioned to direct the first stream toward an inner wall of the sensor body.
6. The sensor assembly of any of aspects 1 to 5, wherein the sensor includes a temperature sensor and/or a pressure sensor.
7. The sensor assembly of any of aspects 1 to 6, wherein the sensor assembly includes a thermal shield between the sensor and the first stream directed to the sensor body.
8. An apparatus comprising:
   a sensor body;
   a sensor positioned within the sensor body; and
   a means for warming the sensor body, wherein the means for warming is coupled or integral to the sensor body, the means for warming comprises a vortex tube configured to separate compressed air into a first stream and a second stream, and the first stream is hotter than the second stream.
9. The apparatus of aspect 8, wherein the sensor body comprises one or more exhaust holes for air from the first stream to exit the sensor body.
10. The apparatus of any of aspects 8 to 9, wherein the apparatus is located at an intake section of a gas turbine engine.
11. The apparatus of any of aspects 8 to 10, wherein the apparatus located on an aircraft.
12. The apparatus of any of aspects 8 to 11, wherein the vortex tube is positioned perpendicular to a direction of an airflow directed to the sensor body.
13. The apparatus of any of aspects 8 to 12, wherein the second stream is directed away from the sensor body.
14. The apparatus of any of aspects 8 to 13, wherein the sensor body comprises an air inlet structure configured to receive air directed at the sensor body from which the compressed air is generated.
15. The apparatus of any of aspects 8 to 14 further comprising a valve configured to control an amount of the compressed air that is received by the vortex tube.
16. A method of de-icing or preventing ice formation, the method comprising:
   supplying compressed air to a vortex tube;
   separating the compressed air, by the vortex tube, into a first stream and a second stream, the first stream hotter than the second stream; and
   warming a sensor body with the first stream; and
   directing the second stream away from the sensor body.
17. The method of aspect 16, wherein the supplying the compressed air comprises supplying compressor bleed air from a compressor of a gas turbine engine.
18. The method of any of aspects 16 to 17, wherein supplying the compressed air comprises generating the compressed air by collecting air through an air collection manifold and channeling the collected air through an air inlet nozzle.
19. The method of any of aspects 16 to 18, wherein supplying the compressed air comprises generating the compressed air by collecting air through a collection structure on the sensor body.
20. The method of any of aspects 16 to 119 further comprising cooling a component of a gas turbine engine with the second stream.

What is claimed is:
1. A sensor assembly comprising:
   a sensor body comprising an air collection manifold configured to generate compressed air from an airflow directed at the sensor body, the air collection manifold comprising a collection channel and a plurality of openings located on an upstream side of the sensor body, the collection channel structured to collect air received through the openings and direct the collected air to a single air inlet nozzle of the sensor body from which the compressed air flows;

a sensor coupled to the sensor body;

a vortex tube enclosed at least in partly within the sensor body, the vortex tube including a first outlet and a second outlet, the vortex tube configured to separate the compressed air into a first stream that exits the first outlet and a second stream that exits the second outlet, the first stream hotter than the second stream, the first stream directed to the sensor body for warming the sensor body; and a valve configured to control an amount of the compressed air that is received by the vortex tube.

2. The sensor assembly of claim 1, wherein the vortex tube is integral to the sensor body.

3. The sensor assembly of claim 1, wherein the first outlet is positioned to direct the first stream toward an inner wall of the sensor body.

4. The sensor assembly of claim 1, wherein the sensor includes a temperature sensor and/or a pressure sensor.

5. The sensor assembly of claim 1, wherein the sensor assembly includes a thermal shield between the sensor and the first stream directed to the sensor body, and the thermal shield is configured to limit any heat transfer from the first stream to the sensor.

6. An apparatus comprising:

a sensor body comprising an air collection manifold configured to generate compressed air from an airflow directed at the sensor body, the air collection manifold comprising a collection channel and a plurality of openings located on an upstream side of the sensor body, the collection channel structured to collect air received through the openings and direct the collected air to an air inlet nozzle of the sensor body from which the compressed air flows;

a sensor positioned within the sensor body;

a means for warming the sensor body, wherein the means for warming is coupled or integral to the sensor body, the means for warming comprises a vortex tube configured to separate the compressed air into a first stream and a second stream, and the first stream is hotter than the second stream; and a valve configured to control an amount of the compressed air that is received by the vortex tube.

7. The apparatus of claim 6, wherein the sensor body comprises one or more exhaust holes for air from the first stream to exit the sensor body.

8. The apparatus of claim 6 wherein the apparatus is located at an intake section of a gas turbine engine.

9. The apparatus of claim 6, wherein the apparatus located on an aircraft.

10. The apparatus of claim 6, wherein the vortex tube is positioned perpendicular to a direction of an airflow directed to the sensor body.

11. The apparatus of claim 6, wherein the second stream is directed away from the sensor body.

12. The apparatus of claim 6, wherein the sensor body comprises an air inlet structure configured to receive air directed at the sensor body from which the compressed air is generated.

13. A method of de-icing or preventing ice formation, the method comprising:

generating compressed air from an airflow directed at a sensor body by an air collection manifold, the air collection manifold comprising a collection channel and a plurality of openings located on an upstream side of the sensor body, wherein generating the compressed air comprises collecting air received through the openings and directing the collected air to a single air inlet nozzle of the sensor body;

controlling, using a valve, an amount of the compressed air that is received by a vortex tube located within the sensor body;

separating the compressed air, by the vortex tube, into a first stream and a second stream, the first stream hotter than the second stream;

warming the sensor body with the first stream; and directing the second stream away from the sensor body.

14. The method of claim 13 further comprising cooling a component of a gas turbine engine with the second stream.

15. The sensor assembly of claim 1, wherein the openings are spaced apart evenly.

16. The sensor assembly of claim 1, wherein the sensor body comprises a plurality of warm air exhaust holes through which air from the first stream may flow, and the warm air exhaust holes are located in a line on a trailing edge of the sensor body.

* * * * *